US012646299B2

(12) United States Patent
Narwade et al.

(10) Patent No.: US 12,646,299 B2
(45) Date of Patent: Jun. 2, 2026

(54) DETECTION OF ANOMALOUS BEHAVIOR

(71) Applicant: Fujitsu Limited, Kawasaki (JP)

(72) Inventors: Pradeep Narwade, Pune (IN); Ryosuke Kawamura, Pittsburgh, PA (US); Gaurav Gajbhiye, Pune (IN); Koichiro Niinuma, Pittsburgh, PA (US)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 18/433,381

(22) Filed: Feb. 5, 2024

(65) Prior Publication Data

US 2025/0037433 A1    Jan. 30, 2025

(30) Foreign Application Priority Data

Jul. 26, 2023    (IN) .............................. 202311050440

(51) Int. Cl.
| | |
|---|---|
| *G06K 9/00* | (2022.01) |
| *G06T 11/60* | (2006.01) |
| *G06V 10/774* | (2022.01) |
| *G06V 20/40* | (2022.01) |
| *G06V 20/52* | (2022.01) |
| *G06V 20/70* | (2022.01) |

(Continued)

(52) U.S. Cl.
CPC ............ *G06V 10/774* (2022.01); *G06T 11/60* (2013.01); *G06V 20/41* (2022.01); *G06V 20/52* (2022.01); *G06V 20/70* (2022.01); *G06V 40/10* (2022.01); *G06V 40/20* (2022.01)

(58) Field of Classification Search
USPC ....... 382/100, 106, 115, 118, 155, 168, 173, 382/181, 254, 286–291, 305, 312
See application file for complete search history.

(56) References Cited

U.S. PATENT DOCUMENTS

| | | | |
|---|---|---|---|
| 11,721,092 B2 * | 8/2023 | Morita | .................. G06V 20/64 |
| | | | 382/103 |
| 2007/0078085 A1 * | 4/2007 | Chung | .................. C07K 16/22 |
| | | | 514/8.1 |

(Continued)

OTHER PUBLICATIONS

Abhishek Aich et al., "Cross-Domain Video Anomaly Detection Without Target Domain Adaptation" WACV Jan. 3, 2023 open access.

(Continued)

*Primary Examiner* — Seyed H Azarian
(74) *Attorney, Agent, or Firm* — Maschoff Brennan

(57) ABSTRACT

Operations include extracting a depiction of a person and associated movement of the person from a first video clip of a first training video included in a first domain dataset. The operations further include superimposing the depiction of the person and corresponding movement into a second video clip of a second training video included in a second domain dataset to generate a third video clip. The operations also include annotating the third video clip to indicate that the movement of the person corresponds to a particular type of behavior, the annotating being based on the first video clip also being annotated to indicate that the movement of the person corresponds to the particular type of behavior. Moreover, the operations include training a machine learning model to identify the particular type of behavior using the second training video having the annotated third video clip included therewith.

17 Claims, 4 Drawing Sheets

(51) Int. Cl.
  *G06V 40/10* (2022.01)
  *G06V 40/20* (2022.01)

(56) References Cited

U.S. PATENT DOCUMENTS

| | | | |
|---|---|---|---|
| 2016/0046298 A1* | 2/2016 | DeRuyck | B60K 28/066 |
| | | | 340/576 |
| 2017/0103264 A1* | 4/2017 | Javan Roshtkhari | G06V 20/49 |
| 2020/0205697 A1* | 7/2020 | Zheng | G06T 3/18 |
| 2020/0210714 A1* | 7/2020 | Kato | G06V 40/103 |

OTHER PUBLICATIONS

Ryo and Yu, "One Video is Sufficient? Human Activity Recognition Using Active Video Composition" IEEE 2010.
Kimata et al., "ObjectMix: Data Augmentation by Copy-Pasting Objects in Videos for Action Recognition" Dec. 13, 2022.
Zou et al., "Learning Representational Invariances for Data-Efficient Action Recognition" Nov. 18, 2022.
Chun et al., "Context-Dependent Video Data Augmentation for Human Instance Segmentation" Dec. 2023.
Extended European Search Report dated Dec. 17, 2024 as received in application No. 24189140.7.

\* cited by examiner

304 — Extract A Person Depiction And Corresponding Movement From An Annotated Source Domain Video Clip 304 — Select A Target Domain Video Clip 306 — Identify Placement Area In Target Domain Video Clip 308 — Select Movement 310 — Movement Within Placement Area?

312 — Modify Placement

314 — Generate Synthetic Video Clip

300

DETECTION OF ANOMALOUS BEHAVIOR

FIELD

The embodiments discussed in the present disclosure are related to detection of anomalous behavior.

BACKGROUND

Machine learning models have become more prevalent in diverse settings and applications. In general, a machine learning model learns, or may be trained, to make determinations based on a training data set that may include real world examples of an environment associated with the machine learning model. For example, a machine learning model may be trained to detect or identify anomalous behavior of individuals or objects that may be captured via video (e.g., recorded video, a live video feed, etc.).

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Operations may include extracting a depiction of a person and associated movement of the person, as depicted in a first video clip of a first training video included in a first domain dataset, from the first video clip. The extracting of the depiction of the person may include extracting an image mask of the person from the first video clip and may be in response to the first video clip being annotated to indicate that the movement of the person, as depicted in the first video clip, corresponds to a particular type of behavior. The operations may further include superimposing the depiction of the person and corresponding movement into a second video clip of a second training video included in a second domain dataset to generate a third video clip. The superimposing may be based on the image mask of the person. In addition, the operations include annotating the third video clip to indicate that the movement of the person, as depicted in the third video clip, corresponds to the particular type of behavior. The annotating may be based on the first video clip from which the depiction of the person and associated movement are extracted also being annotated to indicate that the movement of the person as depicted in the third video clip corresponds to the particular type of behavior. Moreover, the operations training a machine learning model to identify the particular type of behavior using the second training video having the annotated third video clip included therewith.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
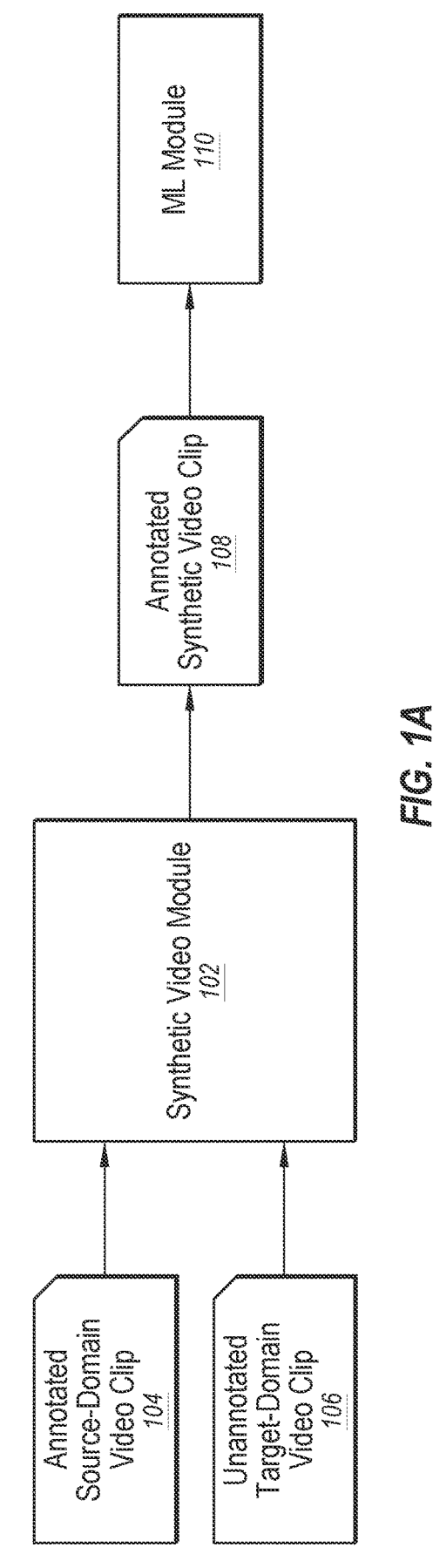
FIG. 1A is a diagram representing an example environment related to generating a synthetic video clip.

Video anomaly detection (VAD) is a computer vision task that involves identifying events that are unexpected to occur, such as fighting and shoplifting. VAD has practical applications in a wide range of fields, including security and surveillance fields.

In some embodiments, machine learning ("ML") models may be trained to perform VAD. In some instances, such training and testing may be performed using same-domain video. Additionally or alternatively, such training may be performed using cross-domain video.

Same-domain video anomaly detection may primarily center on the analysis of videos within a specific domain or contextual framework. This may entail training an ML model on a dataset including normal activities and anomalies that are indigenous to the same domain. For instance, with respect to detecting anomalies in surveillance videos corresponding to a particular location, the ML model may be trained utilizing a training dataset of surveillance footage corresponding to the particular location along with corresponding potential anomalous events.

Conversely, cross-domain video anomaly detection may include training ML models to identify anomalies within videos spanning disparate domains or contexts. This may involve training an ML model on a source domain that may exhibit potential substantial dissimilarities with the target domain where the anomaly detection is desired. By way of illustration, the ML model may be trained on a training dataset of normal videos originating from one domain, such as surveillance video at a first location (e.g., an airport, station, storefront, intersection, etc.), and may subsequently be employed to detect anomalies within a second location different from the first location. Additionally or alternatively, the cross-domain anomaly detection may be with respect to a same location or area but between different camera angles and/or perspectives of the location or area.

In the present disclosure, ML models that are trained using same-domain video may be referred to as "same-domain systems". In addition, the term "same-domain VAD" may generally refer to same-domain systems and/or VAD that is performed based on same-domain training. Further, in the present disclosure, ML models that are trained using cross-domain video may be referred to as "cross-domain systems." In addition, the term "cross-domain VAD" may generally refer to cross-domain systems and/or VAD that is performed based on cross-domain training.

In practical settings, cross-domain VAD may be much more helpful than same-domain VAD, as the target domain may vary from the source domain in terms of context, location, camera angle, anomaly categories, etc. However, despite the benefits of cross-domain VAD as compared to same-domain VAD, most existing approaches focus on same-domain VAD and rely on weakly-supervised learning (WSL) or unsupervised learning (USL) due to the difficulty of collecting frame-level annotations for anomaly videos in each target domain.

According to one or more embodiments of the present disclosure, an ML model may be trained for cross-domain VAD in a supervised manner using "synthetic" image/video generation. In the present disclosure, the supervised training may include using training data from a source domain dataset in which the source domain dataset is labeled with respect to frames that include "anomalous" behavior or "normal" behavior. In these and other embodiments, the source domain dataset may be obtained from a single source domain. Further, behavior depicted in the source domain dataset may be extracted to generate "synthetic" video clips corresponding to one or more target domains that may be different from the source domain. Further, in some embodiments, the synthetic video clip may be used to train an ML model to identify and/or classify a particular type of behavior that has been added to the synthetic video clips. The term "synthetic" with respect to video clips may refer to video clips that have been modified to include depictions of objects, persons, behavior, etc. that may not have been previously included in or captured by the video clip.

In the present disclosure, general reference to persons, objects, behaviors, movements etc. may also refer to depictions of persons, object, behaviors, movements, etc. in images, videos, video clips etc. As such, reference to an image, video, or video clip "including" an object, person, behavior, movement etc. may refer to the image, video, or video clip including a depiction of such an object, person, behavior, etc. Similarly, reference to insertion or extraction of an object, person, behavior, movement etc. with respect to an image, video, or video clip may also accordingly refer to insertion or extraction of respective depictions of such an object, person, behavior etc.

Training ML models in the manner described in the present disclosure may allow for improved cross-domain VAD by being able to utilize a relatively small number of labeled source domain datasets (e.g., one source domain dataset) to generate many labeled training videos that may correspond to multiple different domains. As such, advantages of supervised training may be obtained for a much wider range of datasets and domains than to what originally labeled video clips may correspond.

Embodiments of the present disclosure are explained with reference to the accompanying drawings.

FIG. 1A is a diagram representing an example environment 100 related to generating an annotated synthetic video clip 108 ("synthetic clip 108") based on an annotated source-domain video clip 104 ("source clip 104") and based on an unannotated target-domain video clip 106 ("target clip 106"), according to one or more embodiments of the present disclosure. In these or other embodiments, the environment 100 may be related to training a machine learning model 110 ("ML model 110") using the synthetic video clip 108. The discussion of FIG. 1A is given with respect to generating the synthetic clip 108 by inserting anomalous behavior of a person into the target clip 106. However, the principles and concepts described herewith may be applied to generating synthetic clips by inserting normal behavior of a person into the target clip 106. Additionally or alternatively, the principles and concepts described herewith may be applicable to generating synthetic clips to include one or more types of behavior of persons, objects, animals, etc.

The source clip 104 may be obtained from a source domain dataset that may include one or more video clips that depict one or more persons and corresponding behavior of the one or more persons. In some embodiments, the source domain dataset may correspond to a particular domain that may be associated with VAD. For example, the source domain dataset may include one or more surveillance videos. In these or other embodiments, the surveillance videos of the source domain dataset may be of a certain location at a certain camera angle. In these and other embodiments, the source clip 104 may be annotated to indicate that one or more movements respectively associated with one or more respective persons captured in the source clip 104 correspond to a particular type of behavior (e.g., the annotations may indicate whether the movement corresponds to a "normal" behavior or an "anomalous" or "abnormal" behavior). The terms "normal", "anomalous", and "abnormal" are not defined in the present disclosure in that many different applications may have many different methodologies and/or criteria that are used to determine whether a certain behavior is "normal", "anomalous", or "abnormal" in determining how to determine a corresponding annotation. As such, what is considered in the present disclosure is not how such annotations came about but merely what the annotations indicate.

The target clip 106 may be obtained from a target domain dataset that may include one or more video clips. The target domain dataset may correspond to a different domain than the source domain from which the source clip 104 may be obtained. For example, the target domain may include one or more videos that correspond to (e.g., depict) a first location and the source domain may include one or more videos that correspond to a second location different from the first location. The different locations may differ in setting, situations, etc. Additionally or alternatively, the target domain and the source domain may correspond to a same or similar location, but with respect to different camera angles, perspectives, fields of view, etc.

In these and other embodiments, the target clip 106 may be unannotated with respect to behavior of one or more persons. For example, the target clip 106 may include one or more persons and corresponding movements depicted therein, but the target clip 106 may not be annotated to indicate a particular type of behavior corresponding to the movements (e.g., the target clip 106 may not be annotated to indicated whether the movements correspond to anomalous behavior or normal behavior.). Additionally or alternatively, in some embodiments, the target clip 106 may not include any persons or corresponding movements or behaviors depicted therein.

The environment 100 may include a video module 102 configured to generate the synthetic clip 108 based on the source clip 104 and the target clip 106. The video module 102 may include code and routines configured to enable a computing system to perform one or more operations. In some embodiments, the video module 102 may be implemented using one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In some other instances, the video module 102 may be implemented using a combination of hardware and software. In these and other embodiments, the video module 102 may be implemented by one or more computing devices, such as that described in further detail with respect to FIG. 2.

In some embodiments, the video module 102 may be configured to obtain the source clip 104, which may be selected from the source domain dataset. In these and other embodiments, the source clip 104 may be selected from the source domain dataset in response to the source clip 104 being annotated to indicate that movement of a person, as depicted in the source clip 104, corresponds to a particular type of behavior. In the example of FIG. 1, the annotation may indicate that the movement corresponds to anomalous behavior and the source clip 104 may be obtained by the video module 102 based on such annotation.

The video module 102 may also be configured to obtain the target clip 106. The target clip 106 may be obtained in response to the target domain associated with the target clip 106 being a target domain for VAD.

In there and other embodiments, the video module 102 may be configured to extract the depiction of the person and movement corresponding to the anomalous behavior from the source clip 104. In some embodiments, the person depiction and the corresponding movement depiction may be extracted in response to the movement of the person being indicated by the annotation as corresponding to anomalous behavior. In these or other embodiments, the extraction of the person depiction and corresponding movement depiction may be based on a frame by frame basis of the source clip 104.

In these or other embodiments, the extracted person depiction and corresponding movement depiction may be combined with the target clip 106 to obtain the synthetic clip 108. In these and other embodiments, the synthetic clip 106 may be annotated to indicate that the movement depiction of the person, as extracted from the source clip 104 and now included in the synthetic clip 108 corresponds to the particular type of behavior (e.g., anomalous behavior). Such annotation may be based on the source clip 104 including the same annotation for the corresponding movement.

Figure 1B:
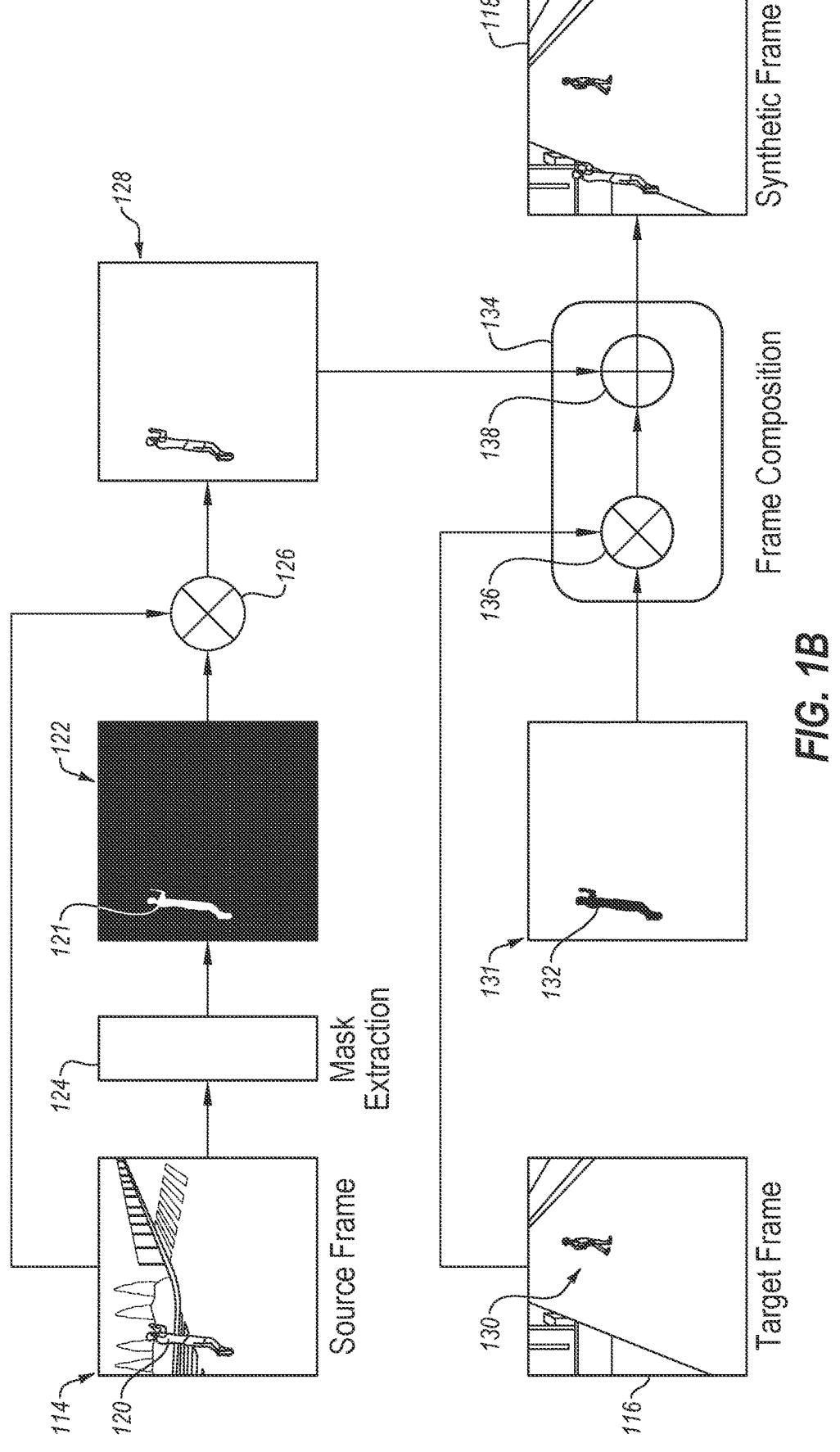
FIG. 1B illustrates an example of generating a synthetic frame of the synthetic video clip of FIG. 1A.

FIG. 1B illustrates an example of generating a synthetic frame 118 of the synthetic clip 108 based on a source frame 114 of the source clip 104 and a target frame 116 of the target clip 106. In some embodiments, the generation of the synthetic clip 108 may include generating multiple synthetic frames as described herein and compiling the synthetic frames to form the synthetic clip 108.

As indicated in FIG. 1B, in some embodiments, the video module 102 may obtain the source frame 114 from the source clip 104. The source frame 114 may be an image that includes a person depiction 120. The source frame 114 may also be annotated to indicate that the person depiction 120 corresponds to anomalous behavior. Based on such annotation, the video module 102 may be configured to perform an image mask extraction operation 124 ("mask extraction 124"). The mask extraction 124 may include extracting an image mask frame 122 ("mask 122") corresponding the person depiction 120. The mask 122 may include an outline 121 of the person depiction 120 as depicted in the source frame 114.

In some embodiments, the mask extraction 124 may include detecting and identifying a region within the source frame 114 that corresponds to the person depiction 120. For example, identification of the region may include identifying the pixels in the source frame 114 that correspond to the person depiction 120. Additionally, the mask extraction 124 may include identifying the region within the source frame 114 that corresponds to the person depiction 120 (e.g. identifying the location of the pixels that include the person depiction 120). In these and other embodiments, the shape of the identified region (which may indicate the outline 121 of the person depiction 120 in the source frame 114) may be extracted from the source frame 114 to obtain the mask 122. Additionally or alternatively, the other information and depictions from the source frame 114 may be omitted from being added to the mask 122 such that the mask 122 may only include the outline 121 of the person depiction 120.

In these and other embodiments, the person depiction 120 may be extracted from the source frame 114 as an extracted person frame 128 based on the mask 122 and the source frame 114. For example, in some embodiments, the extracted person frame 128 may be obtained from the source frame 114 by performing a multiplication 126 (e.g., a pixel-wise multiplication) between the mask 122 and the source frame 114.

Additionally or alternatively, a target frame 116 of the target clip 106 may be obtained. The target frame 116 may be a background image that may include a background 130 at which it may be desired to insert the person depiction 120 to obtain the synthetic frame 118.

In some embodiments, the synthetic frame 118 may be generated using one or more frame composition operations 134 ("frame composition 134"). The frame composition operations 134 may include superimposing the person and corresponding movement into the target frame 116 to generate the synthetic frame 118.

The frame composition operations 143 may be based on the target frame 116, the mask 122, and the extracted person frame 128. For example, in some embodiments, a mask inversion frame 131 ("mask inversion 131") of the mask 122 may be obtained. The mask inversion 131 may be a color inverse of the mask 122 and may include an inverted outline 132 of the outline 121 of the mask 122.

In some instances, the position of the person depiction 120 within the source frame 114 may correspond to a target position of the person depiction 120 within the synthetic frame 118. As such, in these and other instances, the position of the inverted outline 132 within the mask inversion 131 may be the same as the position of the outline 121 in the mask 122. In other instances, the position of the person depiction 120 within the source frame 114 may not correspond to a target position of the person depiction 120 within the synthetic frame 118. As such, in these and other instances, the position of the inverted outline 132 within the mask inversion 131 may be moved according to the target position such that the position of the inverted outline within the mask inversion 131 corresponds to the target position of the person depiction 120 in the synthetic frame 118.

In these and other embodiments, the frame composition 134 may include a multiplication 136 (e.g., a pixel-wise multiplication) between the target frame 116 and the mask inversion 131. The multiplication 136 may insert the outline of the person depiction 120 into the target frame 116 to obtain an intermediate frame (not explicitly illustrated in FIG. 1B). Additionally or alternatively, the frame composition 134 may include an addition 138 (e.g., a pixel-wise addition) between the intermediate frame and the extracted person frame 128 to obtain the synthetic frame 118. The addition 138 may insert the pixels from the extracted person frame 128 that correspond to the person depiction 120 into the outline of the person included in the intermediate frame such that the person depiction 120 is now included in the synthetic frame 118. The generation of the synthetic frame 118 in this manner may allow for insertion of t the person depiction 120 while also omitting other background elements of the source frame 114 such that the person depiction 120 is more naturally included in the synthetic frame 118.

In some embodiments, the frame composition 134 may include one or more other operations with respect to generation of the synthetic frame 118. For example, in some embodiments, the position of the person depiction 120 within the synthetic frame 118 may be determined. In some embodiments, the determined position may be based on areas depicted within the target frame 116 at which a person may be located.

For example, the target frame 116 may include walkways, storefronts, trails, paths, sidewalks, etc. at which persons may commonly be located. As such, placing the person depiction 120 in such an area may help with the synthetic frame 118 and corresponding synthetic clip 108 depicting a possible or realistic scenario. Conversely, the target frame 116 may depict areas at which a person would not or likely would not be located, such as within thick vegetation, on the side of a building, on top of a pole, on top of a tree, etc. As such, placing person depiction 120 in the target frame 116 at one of such areas may result in an unlikely or impossible scenario depiction in the synthetic frame 118 and corresponding synthetic clip 108.

In some embodiments, a placement area may be identified in the target frame 116. The placement area may include any area within the target frame 116 that depicts a physical area at which a person may be located. As indicated above, the placement area may include depictions of walkways, storefronts, trails, foot paths, sidewalks, etc. The placement area may be identified using any suitable technique.

For example, in some embodiments, semantic segmentation may be performed with respect to the target frame 116 and/or the target clip 106. The semantic segmentation may identify and label different types of areas depicted in the target frame 116 and/or target clip 106 including those at which a person may be located. For example, the semantic segmentation may be used to identify and/or label walkways, storefronts, trails, foot paths, sidewalks, etc. depicted in the target frame 116. In these or other embodiments, the semantic segmentation may be used to identify and/or label a ground plane depicted in the target frame 116. Additionally or alternatively, the semantic segmentation may be used to identify trees, vegetation, walls, buildings, posts, the sky, locations above the ground plane, etc. depicted in the target frame 116 that may correspond to places at which a person is not likely to be located.

In these and other embodiments, the placement area may include those portions of the target frame 116 that are indicated by the semantic segmentation as corresponding to places at which a person may be located. For example, portions of the target frame 116 that are identified as depicting walkways, storefronts, trails, foot paths, sidewalks, etc. may be identified as the placement area.

In some embodiments, the placement of the person depiction 120 in the target frame 116 to generate the synthetic frame 118 may be constrained by the placement area. For example, a constraint may indicate that the person depiction 120 may only be placed within the identified placement area. In these or other embodiments, the target position of the person depiction 120 in the synthetic frame 118 may accordingly be within the placement area and constrained to the placement area.

As indicated above, in some embodiments, the operations described with respect to FIG. 1B may be repeated for additional frames of the source clip 104 to obtain additional synthetic frames. The movement (and accordingly corresponding behavior) of the person depiction 120 in the source clip 104 may be propagated to the synthetic clip 108 based on the position of the person depiction 120 changing in the different source frames of the source clip 104 due to movement of the person depiction 120 in which the changed positions may be propagated in the positions of the outline of the person depiction 120 in the subsequently generated mask frames, mask inversion frames, and extracted person frames.

In these or other embodiments, the movement of the person depiction 120 in the synthetic clip 108 may be the same as the movement of the person depiction 120 in the source clip 104. Further, in instances in which the movement of the person depiction 120 is the same, an initial position of the person depiction 120 in the synthetic clip 108 may be the same as the initial position of the person depiction 120 in the source clip 104.

Additionally or alternatively, the initial position of the person depiction 120 in the synthetic clip 108 may be different from the initial position of the person depiction 120 in the source clip 104 (e.g., to ensure that the person 120 is located within a placement area in the synthetic clip 108) while the movement is maintained. In these or other embodiments, the translation of the position of the person depiction 120 in the generation of each corresponding synthetic frame 118 may be the same.

In some embodiments, the movement of the person depiction 120 may be modified for the synthetic clip 108 as compared to the source clip 104. Such an approach may allow for multiple different synthetic clips 108 each depicting different inserted movements to be generated based on the same source clip 104 and same movement depicted in the source clip 104. In some embodiments, the movement modifications may include modifying a speed of the person depiction 120, a direction of the person depiction 120, and/or an elevation of the person depiction 120.

In these and other embodiments, the movement modifications may be accomplished by modifying one or more changes between positions of the person depiction 120 between consecutive synthetic frames 118 as compared to changes between positions of the person depiction 120 between consecutive source frames 114. For example, the position of the person depiction 120 may change by ($\Delta$x1, $\Delta$y1) between two consecutive source frames 114 and the movement may be modified by having the position of the person depiction 120 change by ($\Delta$x2, $\Delta$y2) between two corresponding synthetic frames 118.

In some embodiments, the synthetic video clip 108 having the newly inserted movements annotated as corresponding to a particular type of behavior (e.g., anomalous behavior or normal behavior) may be provided to the ML model 110. The ML model 110 may include any suitable algorithms, computer models, neural networks, deep learning models, or other systems and/or models that may be trained to perform one or more computer vision tasks such as VAD. Although referred to as "a model" the ML model 110 may include any number of models that may operate individually or together.

In these or other embodiments, the synthetic clip 108 and corresponding annotations may be used as training data for the ML model 110. For example, the synthetic video clip 108 may include depictions of added movements annotated as corresponding to anomalous behavior and the ML model 110 may be trained to better identify abnormal behavior based on such input. In some embodiments, the ML model 110 may be trained based on many synthetic clips 108 generated in the manner described in the present disclosure. As indicated earlier, the synthetic clips 108 may correspond to a different domain than the source domain from which the source clip 104 may be obtained. Further, as indicated, multiple different synthetic clips 108 depicting multiple different movements may be generated based on the same movement included in the same source clip 104. Therefore, the embodiments of the present disclosure may help improve the ability to train the ML model 110 by being able to provide large amounts of training data for multiple different domains based on a limited amount of already annotated source data from a limited number of source domain datasets.

Modifications, additions, or omissions may be made to FIGS. 1A and 1B without departing from the scope of the present disclosure. For example, the environment 100 may include more or fewer elements than those illustrated and described in the present disclosure. For example, in some embodiments, the video module 102 and the operations discussed relative to the video module 102 may be performed by a single device or distributed across different systems. Additionally or alternatively, as indicated above, the operations described may also be applied to generating synthetic clips 108 that have "normal" behavior added thereto and annotated accordingly as opposed to "abnormal" behavior. Further, multiple different target clips 106 may be used to generate corresponding synthetic clips 108 in which the target clips 106 may correspond to two or more different domains. Further, any number of different source clips 104 that may correspond to any number of different source domains and source domain datasets may be used.

Figure 2:
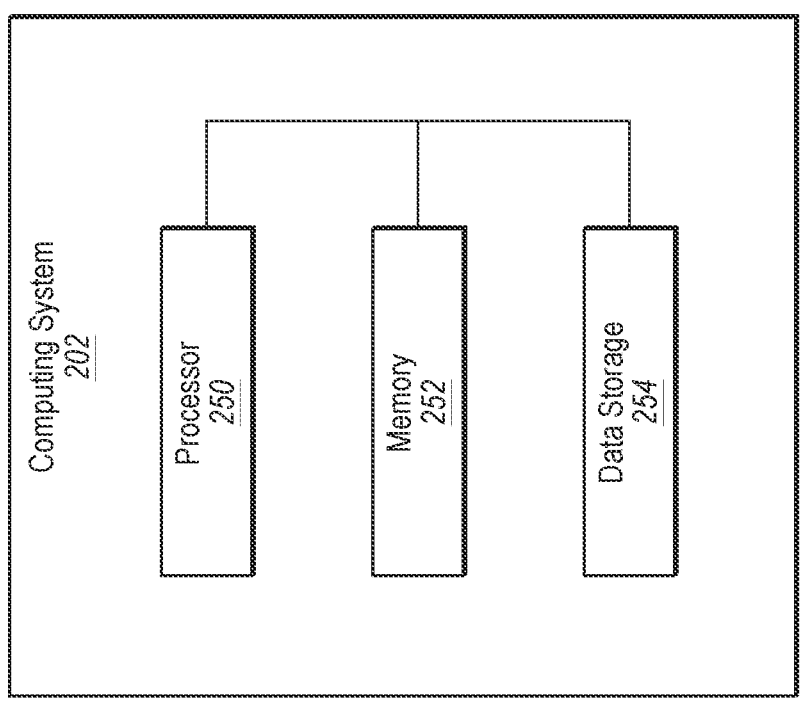
FIG. 2 illustrates a block diagram of an example computing system that may be used to generate synthetic video clips.

FIG. 2 illustrates a block diagram of an example computing system 202 that may be used to generate synthetic video clips, according to at least one embodiment of the present disclosure. The computing system 202 may be configured to implement or direct one or more operations associated with the video module 102 of FIG. 1A, in some embodiments. Additionally or alternatively, the computing system 202 may be used to implement the ML model 110 of FIG. 1A. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, a video module (e.g., the video module 102 of FIG. 1A) may be included in the data storage 254 as program instructions. The processor 250 may fetch the program instructions of the video module from the data storage 254 and may load the program instructions of the m video module in the memory 252. After the program instructions of the video module are loaded into memory 252, the processor 250 may execute the program instructions such that the computing system 202 may implement the operations (e.g., perform the operations and/or cause performance of the operations) associated with the video module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EE-PROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
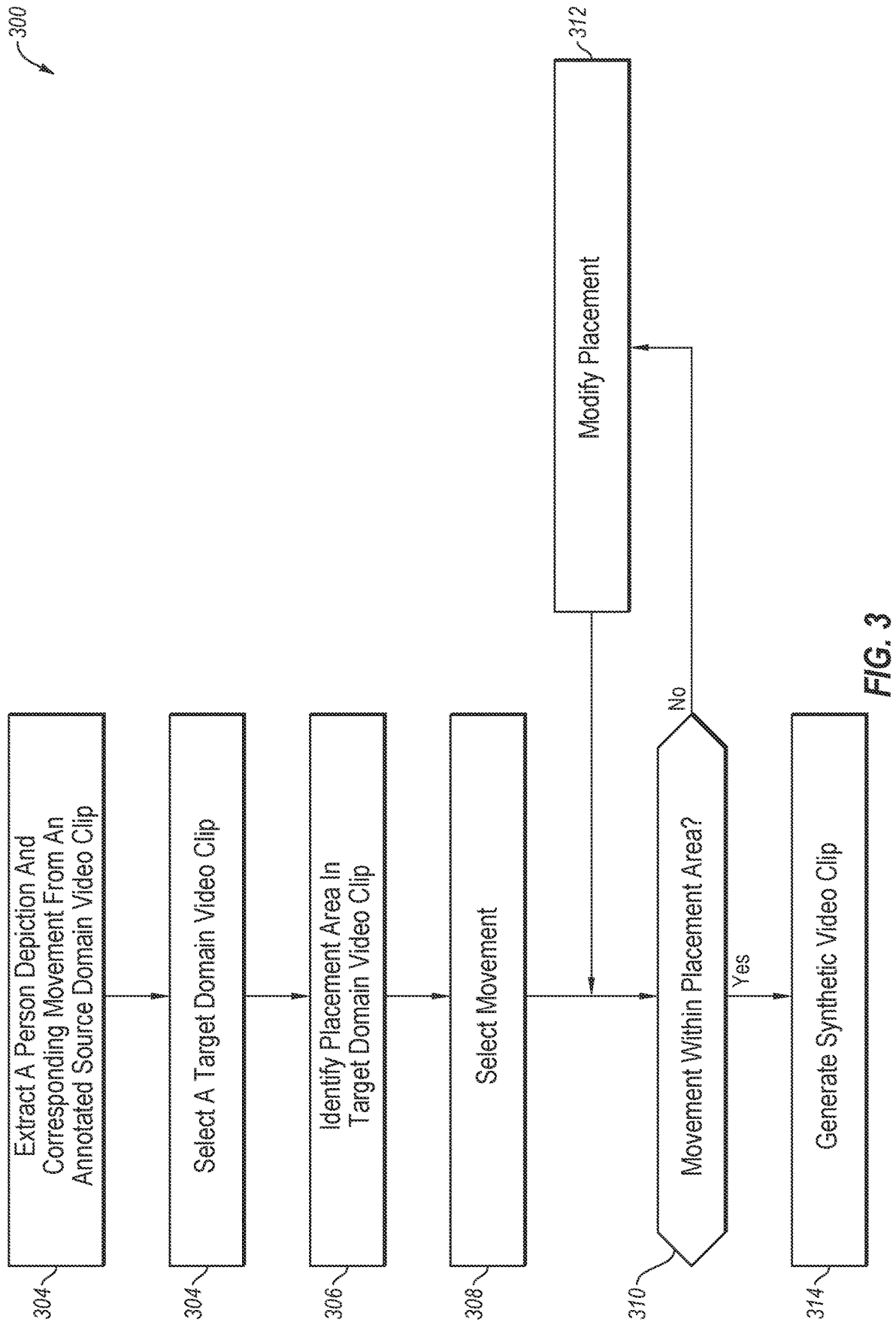
FIG. 3 is a flowchart of an example method of generating a synthetic video clip.

FIG. 3 is a flowchart of an example method 300 of generating a synthetic video clip, according to at least one embodiment described in the present disclosure. The method 300 may be performed by any suitable system, apparatus, or device. By way of example, the video module 102 of FIG. 1A, or the computing system 202 of FIG. 2 (e.g., as directed by the video module 102 in some embodiments) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a depiction of a person and corresponding movement may be extracted from an annotated source domain video clip. In these and other embodiments, the extraction may be performed on a frame-by-frame basis of the source domain video clip. In some embodiments, such extraction may include one or more operations described with respect to FIGS. 1A and 1B.

At block 304, a target domain video clip may be selected for insertion of the depiction of the person and movement corresponding to the person as depicted in the source domain video clip. In some embodiments, such selection may include one or more operations described with respect to FIGS. 1A and 1B.

At block 306, in some embodiments, a placement area in the target domain video clip may be identified. The placement area may be an area identified as suitable for placement of the extracted person and corresponding movement depictions. In some embodiments, such identification may include one or more operations described with respect to FIGS. 1A and 1B.

At block 308, in some embodiments, a movement may be selected. In some embodiments, the movement selection may include selecting the movement as depicted in the source domain video clip. Additionally or alternatively, the movement selection may include selecting to modify one or more of a speed, direction, or elevation of the person depiction as compared to the movement of the person as depicted in the source domain video clip.

In these or other embodiments, selection of the movement may include selecting placement positions of the person depiction within each frame of the target domain video clip that correspond to the movement. Such placement positions may include an initial position, one or more intermediate positions, and a final position. These positions may change from frame to frame according to the selected movement such that the movement is depicted by the synthetic video clip that is generated according to the method 300. In some embodiments, the selection of one or more of the positions (e.g., of the initial position) may include one or more operations described with respect to FIGS. 1A and 1B.

At block 310, it may be determined whether the selected movement depiction is within the identified placement area of the target domain video clip. For example, it may be determined whether any one of the placement positions of the person depiction are located outside of the placement area. In response to at least one of the placement positions being outside of the placement area, the method 300 may proceed from block 310 to block 312.

At block 312, one or more placement positions may be modified. For example, in some embodiments, the initial placement position may be modified such that all other subsequent positions may also be modified to modify the position of the movement as a whole. Additionally or alternatively, the final placement position may be modified such that the final position and all other previous positions may be modified to modify the position of the movement as a whole. In these or other embodiments, one or more positions that are outside of the placement area may be modified individually such that the movement itself is also modified. Following block 312, the method 300 may return to block 310.

Returning to block 310, in response all the placement positions being inside of the placement area, the method 300 may proceed from block 310 to block 314. At block 314, the synthetic video clip may be generated. In some embodiments, the generation of the synthetic video clip may include one or more operations described with respect to FIGS. 1A and 1B.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks.

For example, in some embodiments, the determination of whether the person is included in the placement area for the entire synthetic video clip may be performed after generation of the synthetic video clip and the synthetic video clip may be modified accordingly in response to the movement falling outside of the placement area at any time during the synthetic video clip. Additionally or alternatively, the determination of whether the movement is within the placement area may be performed on a frame by frame basis during the generation of the synthetic video clip frames. In these and other embodiments, applicable modifications may be made with respect to that particular synthetic frame before compiling all the frames into the synthetic video clip.

Further, the method 300 may include one or more other operations such as the training of a machine learning model using the synthetic video clip. For example, the annotations of the synthetic video clip may be used as ground truth data in the training of the machine learning model. In addition the method 300 may be performed to generate any number of synthetic video clips from any number of source domain video clips and/or target domain video clips.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

extracting a depiction of a person and associated movement of the person, as depicted in a first video clip of a first training video included in a first domain dataset, from the first video clip, the extracting of the depiction of the person including extracting an image mask of the person from the first video clip and being in response to the first video clip being annotated to indicate that the movement of the person as depicted in the first video clip corresponds to a particular type of behavior;

superimposing the depiction of the person and corresponding movement into a second video clip of a second training video included in a second domain dataset to generate a third video clip, the superimposing being based on the image mask of the person;

annotating the third video clip to indicate that the movement of the person, as depicted in the third video clip, corresponds to the particular type of behavior, the annotating being based on the first video clip from which the depiction of the person and associated movement are extracted also being annotated to indicate that the movement of the person as depicted in the third video clip corresponds to the particular type of behavior;

modifying the movement of the person as depicted in the first video clip to generate a modified movement depiction;

generating a fourth video clip by at least superimposing the depiction of the person and the modified movement depiction into the second video clip;

annotating the fourth video clip to indicate that the modified movement depiction, as included in the fourth video clip, corresponds to the particular type of behavior; and training a machine learning model to identify the particular type of behavior using the second training video having the annotated third video clip included therewith and using the second training video having the annotated fourth video clip included therewith.

2. The method of claim 1, wherein the annotation indicates that the particular type of behavior is anomalous behavior.

3. The method of claim 1, wherein the movement of the person as depicted in the third video clip is modified as compared to the movement of the person as depicted in the first video clip.

4. The method of claim 3, wherein the movement is modified with respect to one or more of: a direction of the movement, a speed of the movement, or an elevation of the movement.

5. The method of claim 1, wherein the depiction of the person and corresponding movement are superimposed into a depiction of a particular area in the second video clip in response to the particular area being identified as a placement area.

6. The method of claim 5, wherein the particular area is identified as the placement area based on semantic segmentation corresponding to the second video clip.

7. A system comprising:

one or more processors; and one or more non-transitory computer-readable storage media configured to store instructions that, in response to being executed by the one or more processors, cause the system to perform operations, the operations comprising:

extracting a depiction of a person and associated movement of the person, as depicted in a first video clip of a first training video included in a first domain dataset, from the first video clip, the extracting of the depiction of the person including extracting an image mask of the person from the first video clip and being in response to the first video clip being annotated to indicate that the movement of the person as depicted in the first video clip corresponds to a particular type of behavior;

superimposing the depiction of the person and corresponding movement into a second video clip of a second training video included in a second domain dataset to generate a third video clip, the superimposing being based on the image mask of the person;

annotating the third video clip to indicate that the movement of the person, as depicted in the third video clip, corresponds to the particular type of behavior, the annotating being based on the first video clip from which the depiction of the person and associated movement are extracted also being annotated to indicate that the movement of the person as depicted in the third video clip corresponds to the particular type of behavior;

modifying the movement of the person as depicted in the first video clip to generate a modified movement depiction;

generating a fourth video clip by at least superimposing the depiction of the person and the modified movement depiction into the second video clip;

annotating the fourth video clip to indicate that the modified movement depiction, as included in the fourth video clip, corresponds to the particular type of behavior; and training a machine learning model to identify the particular type of behavior using the second training video having the annotated third video clip included therewith and using the second training video having the annotated fourth video clip included therewith.

8. The system of claim 7, wherein the annotation indicates that the particular type of behavior is anomalous behavior.

9. The system of claim 7, wherein the movement of the person as depicted in the third video clip is modified as compared to the movement of the person as depicted in the first video clip.

10. The system of claim 9, wherein the movement is modified with respect to one or more of: a direction of the movement, a speed of the movement, or an elevation of the movement.

11. The system of claim 7, wherein the depiction of the person and corresponding movement are superimposed into a depiction of a particular area in the second video clip in response to the particular area being identified as a placement area.

12. The system of claim 11, wherein the particular area is identified as the placement area based on semantic segmentation corresponding to the second video clip.

13. One or more non-transitory computer-readable storage media configured to store instructions that, in response to being executed, cause a system to perform operations, the operations comprising:

extracting a depiction of a person and associated movement of the person, as depicted in a first video clip of a first training video included in a first domain dataset, from the first video clip, the extracting of the depiction of the person including extracting an image mask of the person from the first video clip and being in response to the first video clip being annotated to indicate that the movement of the person as depicted in the first video clip corresponds to a particular type of behavior;

superimposing the depiction of the person and corresponding movement into a second video clip of a second training video included in a second domain dataset to generate a third video clip, the superimposing being based on the image mask of the person;

annotating the third video clip to indicate that the movement of the person, as depicted in the third video clip, corresponds to the particular type of behavior, the annotating being based on the first video clip from which the depiction of the person and associated movement are extracted also being annotated to indicate that the movement of the person as depicted in the third video clip corresponds to the particular type of behavior;

modifying the movement of the person as depicted in the first video clip to generate a modified movement depiction;

generating a fourth video clip by at least superimposing the depiction of the person and the modified movement depiction into the second video clip;

annotating the fourth video clip to indicate that the modified movement depiction, as included in the fourth video clip, corresponds to the particular type of behavior; and training a machine learning model to identify the particular type of behavior using the second training video having the annotated third video clip included therewith and using the second training video having the annotated fourth video clip included therewith.

14. The one or more non-transitory computer-readable storage media of claim 13, wherein the annotation indicates that the particular type of behavior is anomalous behavior.

15. The one or more non-transitory computer-readable storage media of claim 13, wherein the movement of the person as depicted in the third video clip is modified as compared to the movement of the person as depicted in the first video clip.

16. The one or more non-transitory computer-readable storage media of claim 13, wherein the depiction of the person and corresponding movement are superimposed into a depiction of a particular area in the second video clip in response to the particular area being identified as a placement area.

17. The one or more non-transitory computer-readable storage media of claim 16, wherein the particular area is identified as the placement area based on semantic segmentation corresponding to the second video clip.

* * * * *